United States Patent [19]

Bredehorn

[11] Patent Number: 4,728,294

[45] Date of Patent: Mar. 1, 1988

[54] EDUCATIONAL-TEACHING DEVICE

[76] Inventor: George J. Bredehorn, 713 Francis Dr., Wantagh, N.Y. 11793

[21] Appl. No.: 858,450

[22] Filed: May 1, 1986

[51] Int. Cl.⁴ .................................................. G09B 3/00
[52] U.S. Cl. ...................................... 434/327; 434/427; 273/153 R
[58] Field of Search ..................... 273/153 R; 434/322, 434/327, 262, 427

[56] References Cited

U.S. PATENT DOCUMENTS

| | | | |
|---|---|---|---|
| 840,144 | 1/1907 | Lincoln | 273/161 |
| 1,165,465 | 12/1915 | Taylor | 434/427 |
| 1,526,717 | 2/1925 | Nunez | 434/262 |
| 1,642,424 | 9/1927 | Massey | 273/153 R |
| 1,988,634 | 1/1935 | Stonecypher | 434/262 |
| 2,192,784 | 3/1940 | Beissner | 434/405 |
| 2,948,969 | 8/1960 | Coleman, Jr. et al. | 434/427 |
| 2,984,018 | 5/1961 | Coleman, Jr. et al. | 434/327 |
| 3,186,111 | 6/1965 | Lawlor | 434/262 |
| 3,269,752 | 8/1966 | Lindaman | 283/65 |
| 3,339,295 | 9/1967 | Wanuig | 434/209 |
| 4,196,529 | 4/1980 | Esbensen | 434/327 |
| 4,262,939 | 4/1981 | Schoettle, Jr. | 283/65 |
| 4,349,346 | 9/1982 | Bromberg | 493/325 |
| 4,431,214 | 2/1984 | Buffington | 283/65 |

FOREIGN PATENT DOCUMENTS

| | | | |
|---|---|---|---|
| 1442375 | 12/1966 | France | 273/153 R |
| 598044 | 2/1948 | United Kingdom | 434/172 |

Primary Examiner—John E. Murtagh
Assistant Examiner—Andrew Joseph Rudy
Attorney, Agent, or Firm—Hoffmann & Baron

[57] ABSTRACT

An educational device with which a user employs selected positioning of two masks over an array of normally unintelligible information to decipher an intelligible message therefrom, the positioning of the masks being determined by correctly associating useful information on a base member carrying the unintelligible information with markers and indicia carried on the masks and base member.

10 Claims, 8 Drawing Figures

I HEAR BOTH YOU AND YOUR WIFE WERE HAPPY WITH THE OPERA. HOW COME?

| G | R | O | A | N | S | W | E | R | V | E | T |
| A | S | H | E | N | O | W | E | N | T | I | P |
| H | U | M | A | N | E | W | E | L | L | E | N |
| P | A | P | A | T | H | I | S | A | D | I | D |
| C | O | M | M | A | M | A | D | O | N | T | O |
| S | O | U | R | B | A | N | K | N | O | T | E |
| D | I | N | E | E | D | D | Y | N | A | M | O |
| P | U | R | S | U | I | T | E | A | R | I | D |

FIND THE AREA OF EACH FIGURE

A    B    C    D    E

F    G

Its thirteen o'clock, water is dry, circles are square, babies dont cry, rocks will burn, but paper wont, do you believe that? _____

1. four of the figures have an area that is an even number
   122  yes     no
   124  (♪))   (☆)

2. which is the figure with the greatest area?
   B    D    E    G
   (6)  (4)  (3)  (1)

3. which figure has an area of 11 square units?
   D       G
   (☀)    (🐚)

4. which is the figure with the smallest area?
   A    B    C    F
   (25) (8)  (3)  (5)

5. three figures have a greater area than B.
   yes     no
   (☆)    (D)

6. which two figures have equal areas?
   D&E   A&C   B&D   C&F
   (5)   (3)   (4)   (2)

7. two figures have less area than C.
   yes     no
   (⊕)    (☀)

8. which two figures have a total area of 22 square units?
   E&F   A&G   D&E   B&G
   (17)  (13)  (10)  (15)

EDUCATIONAL-TEACHING DEVICE

BACKGROUND OF THE INVENTION

In teaching useful information to, e.g., students and for various purposes it is well known that the employment of teaching aids or devices that hold the individual's attention, arouse their curiosity and provide an element of challenge to the person learning, gainfully motivate the individual to make the required application necessary to learn the intended useful information and retain same as part of their acquired knowledge. This is particularly true as it relates to teaching children fundamentals of useful information in, e.g., the mathematical disciplines a student must learn to be properly grounded in principles upon which higher levels of learning are founded.

It is desirable where such devices are used that they embody simplicity of construction, relative facility for use and also rely on application of certain logical step-by-step processes of thinking on the part of the user to achieve an intended end.

SUMMARY OF THE INVENTION

The present invention relates to an educational device with which the user can learn useful information and employ that useful information step wise and in correctly collated form thereof to decipher an intelligible message contained in an otherwise unintelligible source of such intelligence. The unintelligible source of intelligence is provided on a flat base member being arranged in a normally unintelligible array such as aligned columns of characters in the form of letters of the alphabet interspersed with known word forms. Additionally, the base member carries a pattern of locator indicia thereon and associated with the placement of a first mask over the array of unintelligible indicia. Additionally, the base member carries thereon a printed listing of useful information in the form of questions and plural answers to each question only one answer in the plurality of same being a correct answer. Thus the user will employ this listing of questions as directions on how to effect placement of the first and a second mask member over the unintelligible indicia to therewith and if properly done, decipher an intelligible message contained in the indicia.

The first mask member which has a plurality of windows therein and a locator opening is positioned over the unintelligible indicia. To properly place the first mask in an intended positioning thereof for a given use situation, it is necessary to register a locator opening in the first mask with a particular indicium in the locator indicia carried on the base member and denoted by the correct answer to one of the questions in the listing on the base member. Following this a second mask member is positioned over the first and in an orientation denoted by the registration of a locator opening in that second mask with an indicium carried on the face of the first mask, that indicium also being learned by correctly answering a question in the question list on the base member. The first mask member in covering over the unintelligible indicia on the base member and when properly positioned for the given situation, covers over a major portion of the indicia but a still unintelligible portion appears in the windows of that first mask. When the second mask which also has windows formed therein is properly positioned and oriented on the first mask, it will cover over unintelligible portions of the intelligence so that there will remain appearing through the windows of the second mask only such intelligence from the source which is of an intelligible nature and constituting a deciphered message to the viewer who has correctly employed the useful information for the purpose intended.

In accordance with the invention and to give same a considerable flexibility in terms of utilization of the mask members with a wide range of useful information to be learned, and as the same may be contained on a plurality of base members, the first mask member can be provided on the two opposite faces thereof with identity markers in the form of distinct depictions or symbols which differ one from the other in respect of the sides and which in the utilization of the first mask will denote the placement of the mask face that faces the user for a given situation. This determination is based on the correct solution to a question contained in the listing of useful information questions. In like fashion the second mask will be provided with identity marker means which are in respect of the two faces of that mask member distinct from each other as well as being distinct from the markers carried on the first mask. In addition to the presence of identity markers on the first mask it contains a formation of locator indicia numerals used to facilitate proper placement of the second mask member by registration of the locator opening in that mask member with a certain one of those numerals. These numerals correspond with like locator indicia pattern numerals appearing on the base member and associated with placement of the first mask. The invention further provides that the windows in the first and second mask members can be provided in the forms of laterally spaced longitudinally disposed rows of elongated blind slots, certain of which are of varying lengths as compared to others and which also may be laterally widened to a greater degree than others to thereby provide a flexibility of use for these mask members when revealing only meaningful portions of unintelligible indicia in a large combination of such messages.

Other objects and advantages of the invention will be described in the description to be given hereinafter and the scope of the invention will be indicated in the claims.

BRIEF DESCRIPTION OF THE DRAWINGS

A fuller understanding of the nature and objects of the invention will be had from the following detailed description taken in conjunction with the accompanying drawings in which:

FIG. 8 is a plan view of another embodiment of the base member and in which the useful information question and answers relate to a more advanced level of information to be learned.

Throughout the following description, like reference numerals are used to denote like parts in the drawings.

DESCRIPTION OF THE PREFERRED EMBODIMENT

As used herein "otherwise unintelligible source of intelligence" means an array of letters and words which present groupings of letters without any particular order or sequence therein along with presentation of known word forms but the same being so arranged that a viewer looking at the array cannot readily discern a meaningful message therefrom even though he will upon scrutiny recognize and understand given ones of the known word forms.

Referring to FIGS. 1-5, the educational teaching device of the invention includes a base member 10 (FIG. 1) a first mask 12 (FIG. 2 and 3), and at least one additional or second mask 14 (FIGS. 4 and 5) all constructed and employed as now will be described.

Figure 1:
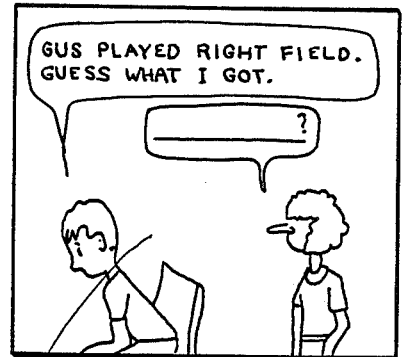
FIG. 1 is a plan view of the base member depicting the intelligence conveying indicia carried thereon in the normally unintelligible array thereof as well as useful information listing of questions and answers employed by the user to properly dispose the first and second masks on the unintelligible array to decipher a message contained therein.
Figure 2:
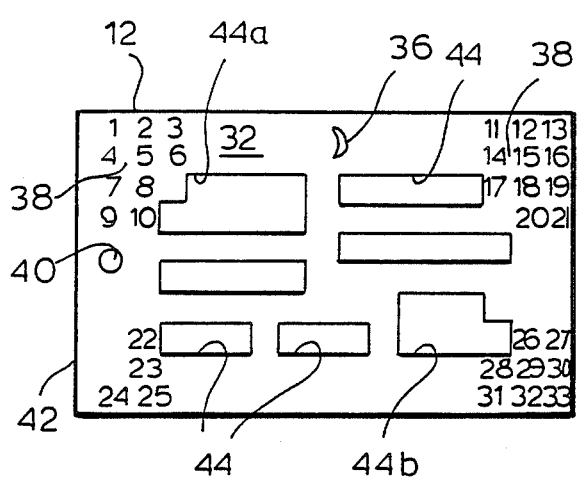
FIG. 2 is a plan view of one or the front face side of the first mask.
Figure 4:
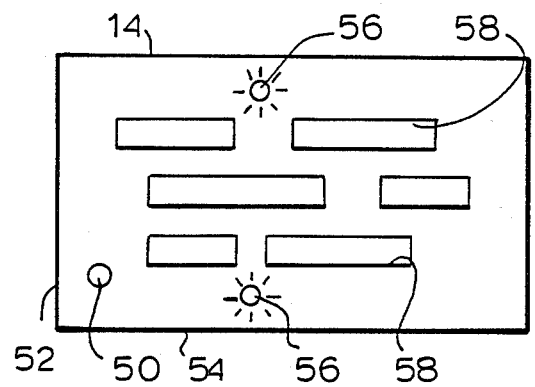
FIGS. 4 and 5 are plan views of the respective two or front and rear faces of the second mask.
Figure 3:
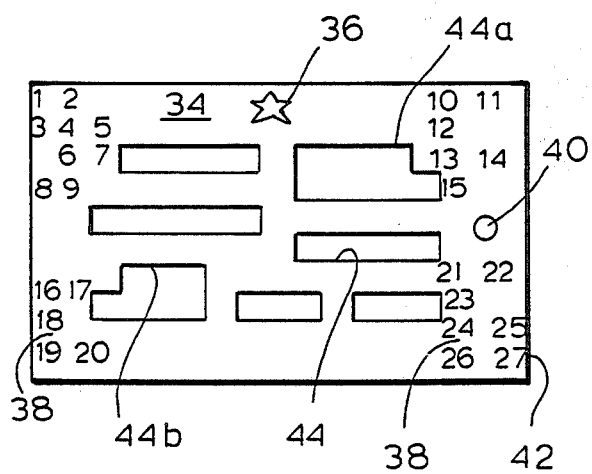
FIG. 3 is a plan view of the other or rear side of the first mask.
Figure 5:
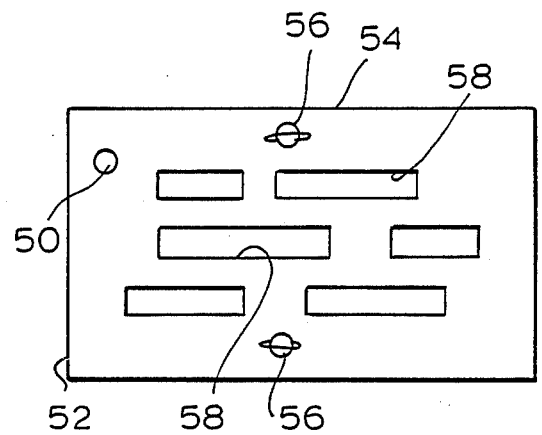

Base member 10 comprises a flat card or sheet of generally rectangular plan shape, use of same in sheet form providing for convenient utilization of the base member in a stock such as a pad of such sheets, each individual sheet having indicia and information thereon which differs from the others. The base member carries intelligence conveying indicia, shown generally at 16, which is located in the upper right hand corner of the sheet, such intelligence being in a normally unintelligible array of the indicia characters 18, the characters being letters of the alphabet arranged randomly in groupings thereof interspersed with known word forms, the presentation being in a longitudinal array of aligned columns of letters, although other presentations such as circularly or hexagonally shaped arrays could also be used in which case corresponding change would be made in the shape of the to be described mask windows. As is readily apparent from the FIG. 1 depiction, the letters 18 per se convey no meaningful or readily understandable message both for the reason of their random arrangement and the close compact presence one with the others. This is so even though upon careful scrutiny, one can recognize the known word forms in the array since the word forms per se are also presented in random unconnected thought sequence. Also located on the base member are locator indicia 20 in the form of a pattern of numbers and the same pattern of such being disposed adjacent the longitudinal ends of the intelligence conveying indicia 16. The locator indicia numbers which with equal facility could be letters instead of numerals or could be symbols, are used in connection with positioning of the first mask 14 on the base member for the purpose and in the manner as will be described later.

Useful information in the nature of that which it is desired to teach to a user such as a student also is carried on the base member. Thus a listing of questions 22 and answers 24 thereto is printed on the base member. There also may be provided in cooperation with the written question form, graphic symbols 26 exemplary of certain factual data involved in the question material and which symbols add to the fanciful and interest culling presentation made by the base member. The base member can additionally include pictorial data in the form of a scene 30 wherein human caricatures present an inquiry, the answer to which is a hidden statement of useful information contained in indicia 16 but unintelligible unless and until the useful information questions and answers and two masks are employed to decipher that message. The questions and answers are provided in sets, i.e., four questions associated with mask disposition over the indicia 18 and the particular face of each mask that is to face the user for a given use.

The first mask 12 has two faces 32, 34 each face carrying an identity marker 36 which marker can be a symbol such as a crescent or a star with the marker on one face being different from that on the other face. The mask 12 is provided as a rectangular member, but it is to be noted that it could be given other shapes as well and in correspondence to how the indicia 18 are laid out, e.g., a circular mask with arcuate windows might be used with concentric circles of indicia 18. The faces of the mask 12 also carry a placement indicia formation 38 thereon, the formation in one face being arrayed differently than that on the other but the indicia in each case being in numeral form although here other forms of indicia than numerals could be used. Indicia 38 is used in effecting proper positioning of the second mask 14 on top of mask 12. Mask 12 is provided with a locator opening 40 which in the particular rectangular embodiment of the mask is located adjacent one transverse margin 42 of the mask and on the longitudinal medial axis of the mask. It also will be noted that the base member 10 is provided with a number of rectangular mask placement perimeters 21 and 23 to further facilitate mask placement, the perimeters defining the confines of the longitudinal and transverse edges of a mask when properly placed with regard to the locator opening thereof and a particular indicia 20. Mask 12 is provided with a plurality of windows 44, the windows being elongated, blind slots disposed longitudinally of the mask. The number and positioning of the windows will of course depend upon the particular letters array in the indicia 16 as well as the makeup of messages to be deciphered. In the depicted mask form, the windows 44 are arranged in spaced groupings extending transversely of the mask and some of the windows, as for example, windows 44a, 44b are laterally widened and/or stepped relative to the width of the others. It also will be noted that the lengths of the windows can be varied one from the others.

The construction of mask 14 is similar to that of the mask 12. It is rectangular in plan profile but of slightly smaller dimension. It has a locator opening 50 but same is located in one corner part of the mask body, i.e., proximate the intersection of transverse margin 52 with longitudinal margin 54. It has identity marker means 56 located adjacent to the margins on both faces with the marker means on the respective two faces being different one from the other such as one being a "sun" and the other a "planet". Such marker means symbols it will be noted also are different from the markers 36 on mask 12. Mask 14 also has windows 58 comprised of laterally spaced rows of longitudinally aligned blind slots. Unlike mask 12, mask 14 has no placement indicia comparable to the indicia 38 of mask 12, although it could have same if a third mask were to be employed in which event the intelligence 18 might be in more complex array and additional questions on the base member would be used in conjunction with selection of face and positioning placement for such third mask.

Figure 6:
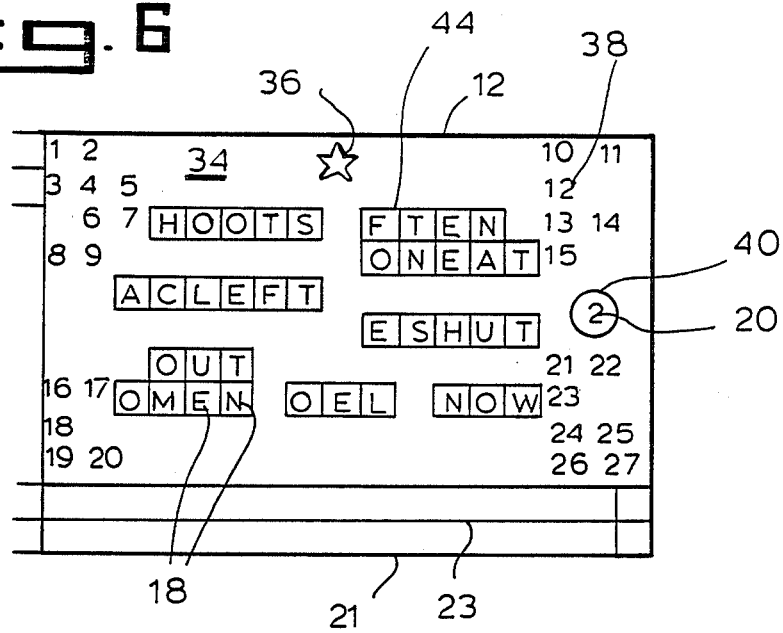
FIG. 6 is a plan view showing the first mask in covering position over the intelligence conveying indicia on the base member and as it is oriented and disposed in accordance with denotive data obtained from certain of the useful information listed on the base member in the embodiment thereof shown in FIG. 1, there still being visible through the mask windows a portion of the intelligence indicia but that portion still being unintelligible.

The device of the invention is used in teaching useful information to the user and is particularly suited for use by school children in the classroom or at home in the learning process. If the user correctly answers questions (and hence learning that information) and in stepwise manner collates that information in selection and use of the masks, he or she will be able to decipher a message hidden in the unintelligible source of information 16. A use of the device now will be described. First the user or student will answer the first question "1" on the base member. The question 22 asks, in conjunction with three geometric figures, a specific matter about those three figures. The answers 24 are only two in number and only one of course is correct. This question is used to denote which face of mask 12 is to be placed upright on the indicia 18. Since the correct answer to the first question is "no" and that answer has a star, the face 34 of the mask, i.e., the face having the identity marker 36 in the form of a star will be placed upright on the indicia 18. Simple placement of the mask 12 over the indicia 18 is not enough though. It is necessary further to locate the mask by registering its locator opening 40 with a selective indicium in the pattern 20 disposed in segments at each end of the array of indicia 18. The determination of that indicium is made by successfully answering question "2". While there are four answers given only that denoting the indicium "2" is correct. Thus the user knows that the locator opening of mask 12 is to be registered with the "2" at the right end of indicia 18. Having answered these questions correctly, the user now places the mask 12 in the positioning shown in FIG. 6 and in which positioning much but not all of the indicia 18 is covered over, only that which is framed by the mask windows 44 showing but that intelligence still being in unintelligible form. It will be readily apparent that indicia pattern 20 is arrayed at both ends of the indicia array for the reason of registering the locator opening 40 with such indicia 20 when the other face of the mask 12 has been designated for upright placement over the indicia 18 by an answer denoting use of the crescent identity marker face.

Figure 7:
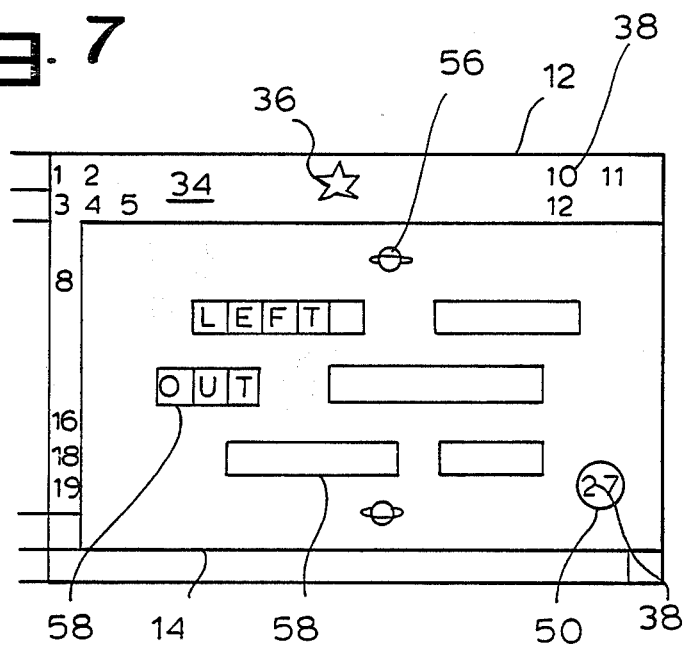
FIG. 7 is a plan view depicting the second mask in place over the first mask and as oriented and positioned by data from the FIG. 1 useful information to thereby allow an intelligible message decipherment.

The user now goes on to dealing with and correctly answering questions "3" and "4" so as to properly orient and place mask 14 over mask 12. Since the correct answer to question "3" is associated with an identity marker means 56 on mask 14 in the form of a planet, that designated face is placed upright on mask 12. The correct answer to question "4" is the indicium numeral 27. Thus the locator opening 56 of mask 14 is registered with that numeral of the placement indicia formation 38 carried on the face of mask 12. When the user does this, the mask 14 will cover up so much of the unintelligible indicia 18 showing through the windows 44 of that mask that only a clear and readily perceived intelligible portion thereof will be framed by the windows 58 of mask 14. In this given use, the message deciphered by correct use of the masks is and as shown in FIG. 7, "left out". This particular message it will be noted is associated with the scene 30 on the base member and itself answers a query as propounded in that scene.

The successful employment of the device involves the user correctly answering in sequence a set of at least four questions and thus the useful information on the base member must include questions and answers thereto in multiples of four (or six if three masks were used). By correctly answering questions "5"-"8" on the FIG. 1 base member embodiment, the user will decipher the message "and for me to know."

FIG. 8 depicts a base member 110 having useful information in question and answer form which is more advanced than that shown in FIG. 1. Successfully using the device with this base member embodiment will provide in respect of questions 1-4, the message "she went I did not" and in respect of questions 5-8, the message "well don't". The type and complexity of the useful information used with the device is almost unlimited. Further the permutations of deciphered messages can be many depending on how the indicia 118 be arrayed and how the windows are situated in the masks.

While there is above disclosed only one embodiment of the educational device of the present invention, it will be appreciated that various modifications can be made within the scope of the disclosed invention.

What is claimed is:

1. An educational device with which a user can learn and employ useful information in stepwise and correct collation of such information to decipher an unintelligible source of such intelligence, said device comprising
   a generally flat base member, said base member having intelligence conveying indicia thereon arranged in a normally unintelligible array thereof, said base member further having a pattern of locator indicia thereon, and additionally carrying a printed listing thereon of useful information in the form of questions and plural answers to each question only one answer of which is correct,
   a first mask positionable over the base member unintelligible indicia array, said first mask having two opposed faces, each of said two faces carrying indicia markers thereon, that on one face being distinctive from that on the other face, said first mask further having windows therein and a locator opening, the locator indicia pattern on said base member being associated with positioning of the mask locator opening in register over a select one of the indicia in said pattern, the windows in said mask uncovering a portion only of said card unintelligible indicia array when the mask locator opening is registered with said select one indicium, said mask having a placement indicia formation on each of its opposed faces the correct answers to certain of the useful information questions on said base member being denotive of the face of said first mask which must be upright when said first mask is positioned over said array and the said one indicium with which said first mask locator opening is to be registered, and
   at least one additional mask positionable over the first mask, said additional mask having two opposed faces, each of said two faces carrying indicia markers thereon, that on one face being distinctive from that on the other face, said additional mask further having windows therein and a locator opening, the placement indicia formation on said first mask being associated with positioning of the additional mask locator opening in register over a certain one of the indicia in said formation and when the additional mask locator opening is registered over such certain one indicium, the windows of said additional mask uncovering only so much of the unintelligible intelligence array framed by the first mask windows as presents an intelligible message, the correct answers to others of the useful information questions on said base member being denotive of the face of said additional mask which must be upright when positioned over said first mask and the said certain one indicium on the first mask with which said additional mask locator opening is to be registered.

2. The educational device of claim 1 in which the said additional mask member placement indicia formation on one face is differently arranged than that on the other face.

3. The educational device of claim 2 in which the additional mask indicia marker means is distinguishable from the indicia marker means on the faces of the first mask.

4. The educational device of claim 3 in which the base member intelligence conveying indicia is arranged in a longitudinal array of aligned columns of indicia characters, the locator indicia pattern on said base member being carried in pattern segments thereof adjacent each end of said longitudinal array.

5. The educational device of claim 3 in which the windows in said first mask comprise a plurality of longitudinally directed blind slots in said mask, certain of said slots being longer than others with some of said slots being laterally spaced relative to others.

6. The educational device of claim 5 in which some of the slots in said plurality are laterally wider than others.

7. The educational device of claim 5 in which the windows in said additional mask comprise transversely spaced, longitudinally directed rows of elongated blind slots, the slots in each row being aligned, the slot lengths varying within each row and with at least some of the slots in the other rows.

8. The educational device of claim 3 in which the locator opening in the first mask is disposed in a geometrical portion thereof which is distinct from that of the portion in which the locator opening in the additional mask is disposed thereby to preclude interchangeable use of such masks with the respective associated locator indicia other than that properly associated with a given mask.

9. The educational device of claim 3 in which each mask is an elongated member having longitudinal and transverse margins, the locator opening in the first mask being located adjacent one transverse margin of said first mask and symmetrically of the longitudinal medial axis of said first mask.

10. The educational device of claim 9 in which the locator opening in the additional mask is located proximate a corner of said additional mask defined by intersection of a transverse margin of said second mask with a longitudinal margin.

* * * * *